April 11, 1961

F. P. RE CASINO 2,978,942

DICING MACHINE HAVING SPACED TRANSVERSE CUTTERS ASSOCIATED WITH ROTARY SLITTERS

Filed Feb. 21, 1957

INVENTOR.
FRANK P. RE CASINO
BY Richard T. Laughlin
ATTORNEY

INVENTOR.
FRANK P. RE CASINO
BY Richard T. Laughlin
ATTORNEY

INVENTOR.
FRANK P. RE CASINO
BY Richard T. Laughlin
ATTORNEY

INVENTOR.
FRANK P. RE CASINO
BY Richard T. Laughlin
ATTORNEY

United States Patent Office 2,978,942

Patented Apr. 11, 1961

2,978,942

DICING MACHINE HAVING SPACED TRANSVERSE CUTTERS ASSOCIATED WITH ROTARY SLITTERS

Frank P. Re Casino, Parsippany, N.J., assignor to Congoleum-Nairn Inc., Kearny, N.J., a corporation of New York Filed Feb. 21, 1957, Ser. No. 641,723

4 Claims. (Cl. 83—355)

This invention relates to a machine for cutting material into discrete pieces and particularly to a machine adapted to cut a soft sheet material, such as linoleum, into rectangular chips.

Linoleum is manufactured by calendering together particles of soft plastic linoleum composition to form a uniform smooth sheet. A particularly striking design effect is obtained by calendering together multicolored rectangular pieces of linoleum composition. Heretofore, it has been difficult to produce such rectangular pieces of linoleum composition in the quantities required for present high speed commercial practices. A sheet of linoleum composition as received directly from a calender is in a soft and tacky state and must be subjected to slow oxidation in a heated atmosphere for an extended period of time, usually of the order of one to three months, to harden the sheet. The previous procedure for cutting sheets of freshly calendered linoleum composition into rectangular chips was to slit them into long narrow bands by passing them through a circular disc type slitter. In this operation, extreme care must be exercised in the slitting operation to prevent the strips from being welded together as they leave the slitter. It is usually necessary to apply talc or other fine powder to the surface of the strip to diminish the sticky nature of the strips. The bands are then wound on spools and allowed to cool and harden. The spools are then conveyed to a rotary-type cutter where the bands are unwound from the spool and are fed individually into the cutter which cuts them transversely into chips of the desired rectangular shape and size. The desirability of being able to simplify these operations by cutting the linoleum sheet into rectangular pieces immediately after calendering is readily apparent. It has been proposed to mount a rotary-type cutter adjacent to the slitter so that the strips can be cut transversely as they leave the slitter. One such device is disclosed in U.S. Patent 2,739,647 which issued to P. Coste on March 27, 1956. The type of machine disclosed in this patent is very effective when handling hard sheet material but when handling soft material it is necessary to insert some feeding means, such as a roller, between the slitter and rotary cutter to feed the strip to the cutter. Without such feeding means the soft strips will fold upon themselves and jam in the machine. The use of a roller as a feeding means causes the adjacent soft strips to be welded together so that they cannot be cut into uniform pieces. The action of the cutter will also cause the adjacent cut pieces to be fused or welded together.

An object of the invention is to efficiently and economically convert relatively soft and sticky sheets into small rectangular chips or pieces.

A related object is to maintain positive control over the sheet material so as to insure that the chips produced are of uniform size and shape.

A more specific object is to provide a machine for producing rectangular chips of plastic material from soft, sticky sheets by utilizing these detrimental characteristics of the sheets.

These objects are attained in accordance with the invention by the use of a machine of unique construction. This machine includes two intermeshing circular disc slitters revolving in opposite directions, adapted to slit a sheet of soft, sticky plastic material fed between their meshing edges into a plurality of longitudinal strips and a rotary cutter associated with each slitter, for chipping or cutting the strips transversely into rectangular chips or pieces. More specifically, the slitters are designed and arranged so that the action of slitting the sheet into a plurality of longitudinal strips causes alternate strips to be pushed or wedged between the sides of adjacent cutting discs. Each set of alternate strips are wedged into a different slitter. The depth to which the strips are wedged between the adjacent discs is determined by the amount of overlap or mesh of the discs. Each set of alternate strips follows the motion of the set of discs between which they are wedged so that the original sheet is divided into two separate sets or streams of strips. In each stream, the strips are separated from each other by the width of the adjacent disc. The two streams of strips are allowed to rotate with their respective adjacent discs for part of one revolution of the discs until they reach a point where they are individually raked out from between their respective discs. As each set of strips is removed from between the discs it is subjected to a shearing or chipping action by a rotary cutter associated with the slitter thereby forming the desired rectangular pieces. Each rake is constructed so that one of its edges serves as a bed knife or shearing edge for its associated rotary cutter. In this manner, the strips of material are held by the adjacent discs and are under positive control at all times while they are being fed to the rotary cutter. This positive control insures that the resulting chips or pieces are of uniform size and shape. The separation of the alternate strips of material after the slitting operation prevents undesired welding together of the strips due to their tacky nature prior to or after the final cutting operation.

Other objects and advantages of the invention will be apparent from the following detailed description when read in conjunction with the drawings in which.

Figure 1:
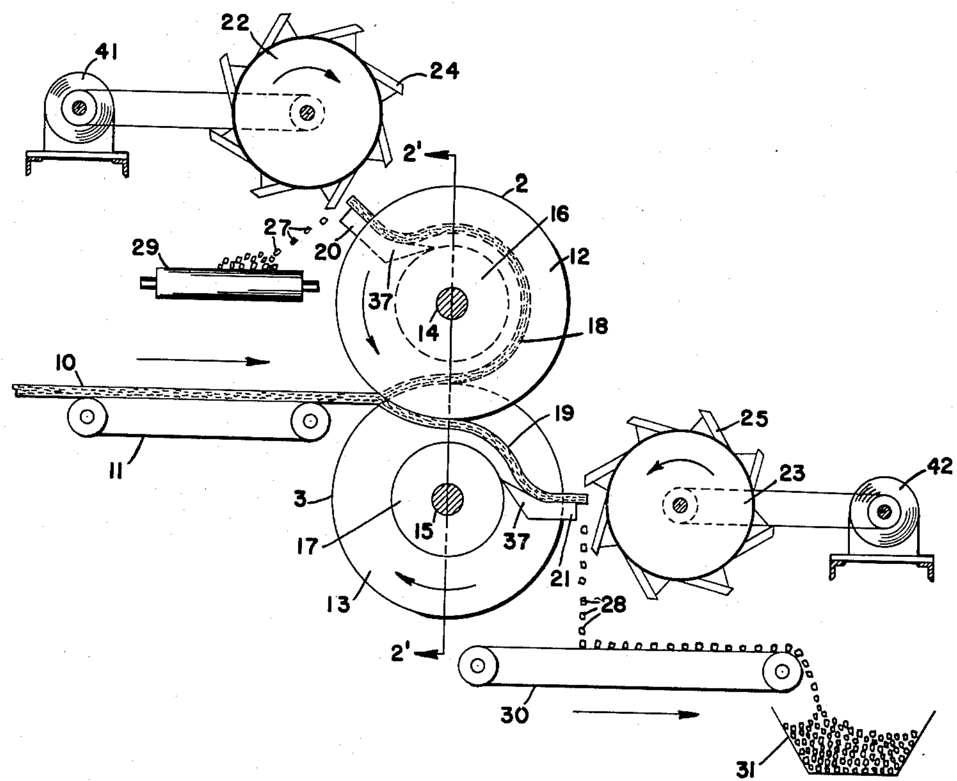
Fig. 1 is a side elevation, partly in section of the dicing machine of the invention.
Figure 2:
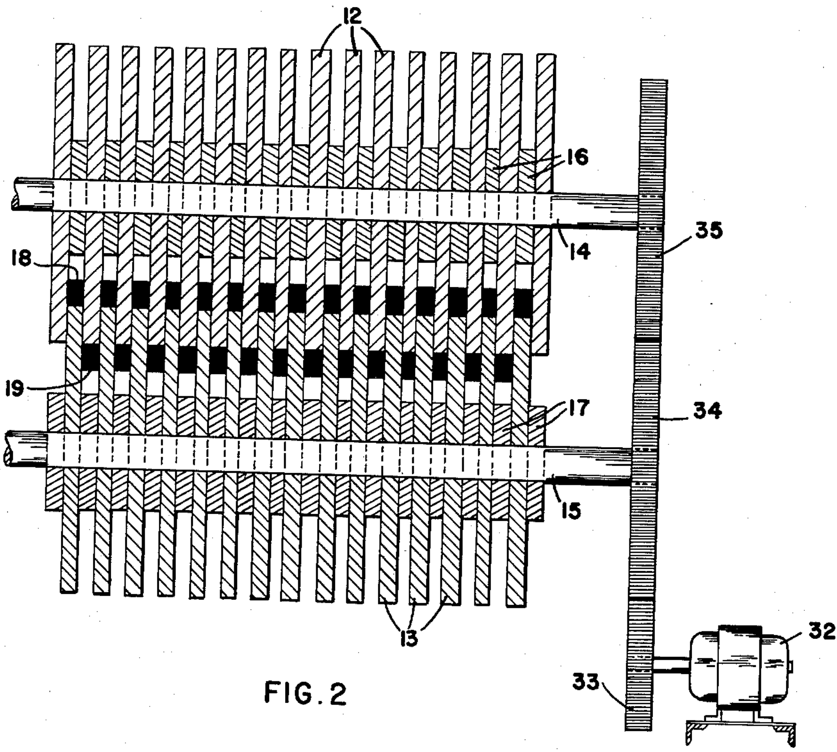
Fig. 2 is a front elevation of a portion of the machine of Fig. 1, showing the circular disc slitters in section with the strips of plastic material wedged between their discs after the slitting operation, and means provided for driving the slitters.

Referring to Figs. 1 to 7, a sheet 10 of soft plastic material is conveyed to the dicing machine by a continuous conveyor belt 11, and is fed into the nip of two circular disc slitters 2 and 3 respectively mounted on the parallel separate transverse shafts 14 and 15, and rotated in opposite directions by the motor 32 through the gears 33 to 35. At the point of intermeshing, the revolving slitters 2 and 3 are moving in a direction generally parallel with the sheet 10 which causes the latter to be pulled to the slitters 2 and 3. Each of the slitters 2 and 3 is composed of a set of parallel spaced cutting discs 12 and 13 which are respectively mounted on a different one of the two shafts 14 and 15. The distance between the adjacent cutting discs of the set mounted on each shaft is maintained by the spacers 16 and 17 for the respective sets and is slightly larger than the thickness of one cutting disc of the other set. Each set of cutting discs 12 and 13 on the two shafts 14 and 15 are offset with respect to the cutting discs of the other set so that when the two shafts revolve the discs of each set pass through the spaces between the discs of the other set, and at the point of intermeshing the fit is close enough to allow the cutting discs to make a clean cut of the plastic material between the discs. As the plastic sheet 10 passes between the adjacent discs of the two sets 12 and 13, it is cut longitudinally into strips by these discs. The slitting action of the two sets causes the alternate strips 18 and 19 to be separated and respectively forced between the adjacent discs of the sets 12 and 13 mounted on different shafts 14 and 15, respectively. The rotating movement of the sets 12 and 13 of cutting discs causes each of the two streams or sets of separated alternate strips 18 and 19 to be revolved in opposite directions through an arc to a point where they respectively contact a different one of the rakes 20 and 21 which individually operates to scrape the strips 18 and 19 individually from between the adjacent discs of the slitters 2 and 3 respectively.

Figure 3:
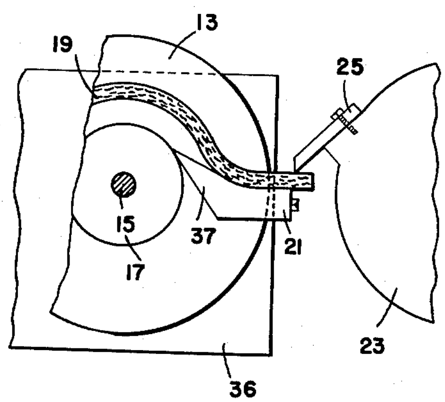
Fig. 3 is a side elevation, partly in section, of a portion of the dicing machine of Fig. 1 showing the construction of one set of cutting discs and the associated rake and rotary cutter more clearly.

As each strip 18 and 19 is removed by the rake 20 or 21 from between the adjacent discs of the sets 12 or 13 on the slitter 2 or 3, respectively, it is cut transversely by the action of the associated rotary cutter 22 and 23, respectively. Each of the rotary cutters 22 and 23, as shown in Figs. 1 and 3, are equipped with a set of peripheral blades 24 and 25, respectively, which cuts the strips by a shearing action with an edge of the associated rake 20 or 21. The rectangular pieces or chips 27 and 28 cut from each strip are collected on moving belt conveyors 29 and 30, respectively, which carry these pieces to a suitable container 31, such as a hopper. The circular disc slitters are driven by a motor 32 through gears 33, 34 and 35 which can also drive the rotary cutters. Alternately, the rotary cutters 22 and 23 can be driven by independent motors 41 and 42.

Figure 4:
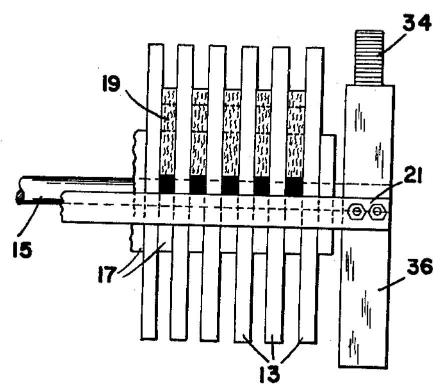
Fig. 4 is a front elevation view of the portion of the dicing machine shown in Fig. 3.
Figure 5:
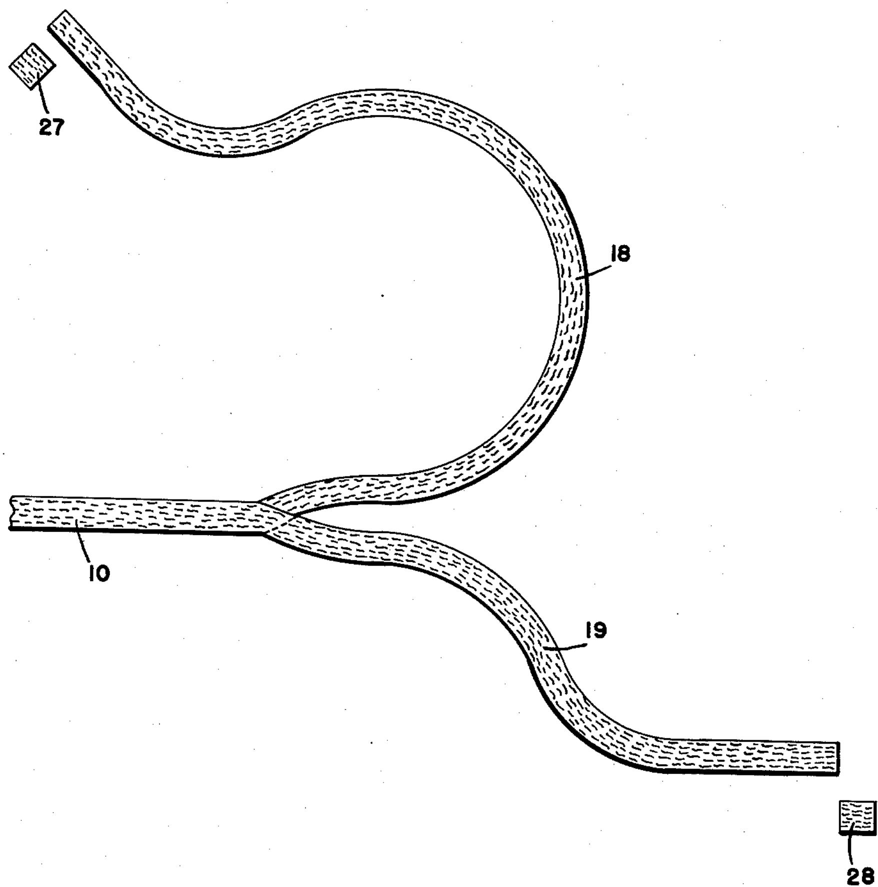
Fig. 5 is a side elevation showing the condition of the sheet in the various stages as it passes through the machine.

The rakes can be constructed in various forms and located at any convenient position on the periphery of the circular disc slitters 2 and 3. As illustrated in Figs. 3 and 4, the rake 21 may be secured to the gear housing 36. The rake 21 has a series of parallel fingers 37 which extend between each pair of adjacent discs 13 and scrape the strips 19 from between the discs 13. As stated previously, the edge of the rake 20 or 21 serves as a shearing edge for the rotary cutter 22 or 23, respectively, which cuts the strips into rectangular pieces. The rotary cutter should be located so that it cuts the strips as close to the discs as possible so that maximum control over the strips can be maintained during cutting. If desired, the rotary cutters and rakes can be so constructed that the transverse cutting of the strips takes place between the discs.

Figure 6:
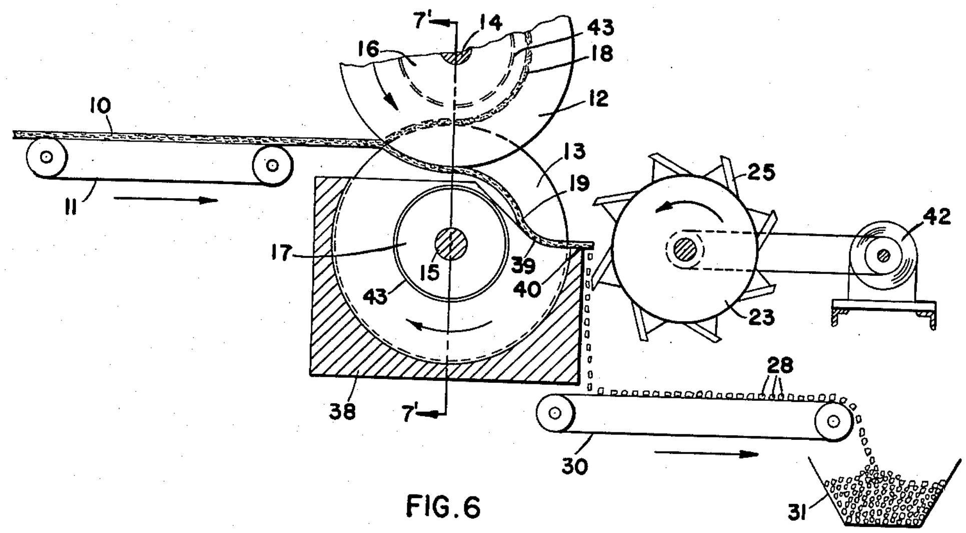
Fig. 6 is a front elevation, partly in section, of a modification of the dicing machine of the invention.
Figure 7:
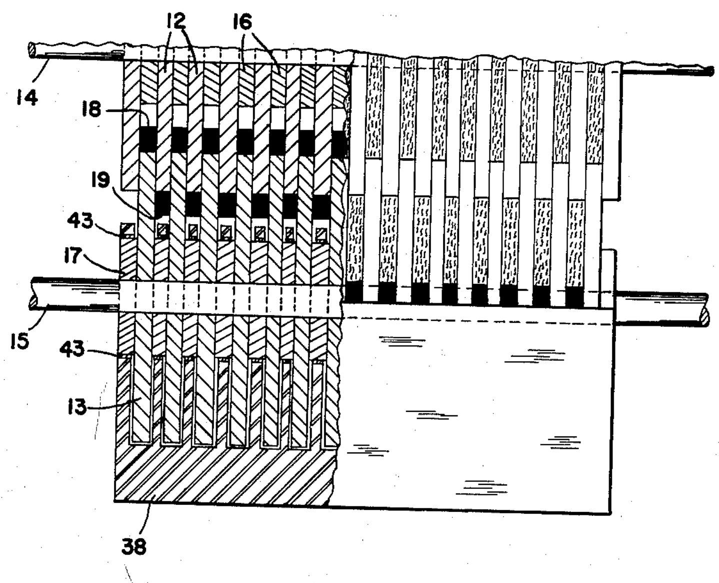
Fig. 7 is a side elevation, partly in section, of a portion of the modification of the dicing machine shown in Fig. 6.

A second modification of the rake is shown in Figs. 6 and 7 wherein the rake 38 has the primary function of serving as the bearing for the shaft 15 and spacers 17. The bearing 38 extends between each pair of adjacent discs and is curved on one end 39 so that it can serve as a rake to remove the strips from between the discs. The spacers 17 ride on bushings 43 which form part of the bearing 38. The edge 40 of the bearing will serve as one shearing edge to cooperate with the rotating cutter 23 and its associate blades 25 for cutting the strips into rectangular pieces.

Pieces of other than rectangular shape can be produced by changing the shape of the blades 24 and 25 and their corresponding shearing surfaces. Also by varying the number of blades 24 and 25 and the distance between them on the rotary cutters 22 and 23, it is possible to produce pieces of random shape and length simultaneously.

The dicing machine of the invention, although particularly suitable for cutting large sheets of soft material, is also capable of cutting any sheet material into small rectangular pieces having a uniform size and shape. In a manner similar to that described above, the dicing machine can cut hard plastic sheets, paper, rubber, metal sheets and the like.

Any departure from the above description which conforms to the present invention is intended to be included in the scope of the claims.

What is claimed is:

1. A machine for cutting soft, tacky sheet material into a plurality of small pieces or chips of rectangular shape and uniform size, which comprises two intermeshing sets of slitting discs rotating in opposite direction which the sheet of said material is fed, adapted to slit said sheet lengthwise into a plurality of strips and to wedge alternate ones of said strips between different pairs of adjacent slitting discs so that the alternate strips are wedged in one set of discs, an individual rake associated with each of said sets adapted when that set has been rotated to a particular point in its cycle to rake out the strips of wedged material from between the discs thereof and an individual cutter associated with each of said rakes, operating in conjunction with a shearing edge to continuously cut successive portions from said strips by cutting said strips transversely at a point not substantially beyond the point of said strips passing from between said discs while said next succeeding portion of each of said strips is held by said adjacent discs.

2. A machine for cutting soft, tacky sheet material into a plurality of small pieces or chips of rectangular shape and uniform size, which comprises two intermeshing sets of slitting discs rotating in opposite directions between which the sheet of said material is fed, adapted to slit said sheet lengthwise into a plurality of strips and to wedge alternate ones of said strips between different pairs of adjacent slitting discs so that the alternate strips are wedged in one set of discs, an individual rake associated with each of said sets adapted when that set has been rotated to a particular point in its cycle to rake out the strips of wedged material from between the discs thereof and an individual rotating cutter associated with each of said rakes, operating in conjunction with a shearing edge of that rake to cut transversely at substantially the point of passing from between said discs the raked-out strips while spaced apart and held by said adjacent discs into pieces of said rectangular shape and uniform size.

3. The machine of claim 2 wherein at least one of said rakes serves as a bearing support for its associated set of slitting discs.

4. The machine of claim 2 wherein said rakes are located so as to allow said strips to travel through a substantial portion of one revolution of said discs prior to removing from between said discs.

References Cited in the file of this patent

UNITED STATES PATENTS

| | | |
|---|---|---|
| 376,025 | Broussier | Jan. 3, 1888 |
| 1,039,795 | Pfenninger | Oct. 1, 1912 |
| 2,739,647 | Coste | Mar. 27, 1956 |
| 2,770,302 | Lee | Nov. 13, 1956 |

FOREIGN PATENTS

| | | |
|---|---|---|
| 330,135 | Italy | Oct. 4, 1935 |
| 91,160 | Sweden | Dec. 28, 1937 |
| 890,373 | France | Nov. 2, 1943 |